(12) United States Patent
Kondo

(10) Patent No.: US 6,690,831 B1
(45) Date of Patent: Feb. 10, 2004

(54) ENCODING DEVICE AND ENCODING METHOD, DECODING DEVICE AND DECODING METHOD, INFORMATION PROCESSING DEVICE AND INFORMATION PROCESSING METHOD AS WELL AS A MEDIUM

(75) Inventor: Tetsujiro Kondo, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/352,241

(22) Filed: Jul. 13, 1999

(30) Foreign Application Priority Data

Jul. 15, 1998 (JP) .............................. 10-200093

(51) Int. Cl.[7] .............................. G06K 9/36; G09C 3/00
(52) U.S. Cl. .................. 382/232; 382/100; 380/54
(58) Field of Search .................. 382/232, 100; 235/462.3; 358/261.2; 380/54; 713/176; 379/114.19, 91.01, 91.03; 902/22, 23

(56) References Cited

U.S. PATENT DOCUMENTS

| | | | | |
|---|---|---|---|---|
| 3,875,419 A | * | 4/1975 | Harms, Jr. ................... 250/568 |
| 3,896,266 A | * | 7/1975 | Waterbury ................. 179/1 SB |
| 5,144,663 A | | 9/1992 | Kudelski et al. ................ 380/16 |
| 5,179,642 A | * | 1/1993 | Komatsu ..................... 395/135 |
| 5,402,499 A | * | 3/1995 | Robison et al. .............. 381/119 |
| 5,717,821 A | * | 2/1998 | Tsutsui et al. .............. 395/2.14 |
| 5,838,963 A | * | 11/1998 | Griffiths ..................... 395/606 |
| 5,848,155 A | * | 12/1998 | Cox ................................ 380/4 |
| 5,915,027 A | * | 6/1999 | Cox et al. ...................... 380/54 |
| 5,970,140 A | * | 10/1999 | Sandford, II et al. ........... 380/7 |
| 6,111,506 A | * | 8/2000 | Yap et al. ................. 340/572.1 |
| 6,192,138 B1 | * | 2/2001 | Yamadaji ..................... 382/100 |
| 6,209,092 B1 | * | 3/2001 | Linnartz ...................... 713/176 |
| 6,411,725 B1 | * | 6/2002 | Rhoads ........................ 382/100 |

FOREIGN PATENT DOCUMENTS

| | | | |
|---|---|---|---|
| EP | 0 635 828 | 1/1995 | ........... G11B/20/00 |
| EP | 0 762 764 | 3/1997 | .......... H04N/7/167 |
| EP | 0 838 785 | 4/1998 | ........... G06T/11/00 |
| WO | WO 97/48056 | * 12/1997 | ........... G06F/13/40 |
| WO | WO 99 10837 | 3/1999 | ............ G06K/9/36 |

OTHER PUBLICATIONS

Schyndel Van R G et al: "Key Independent Watermark Detection" Proceedings of the International Conference on Multimedia Computing and Systems, Jun. 1999, XP000937727.

* cited by examiner

*Primary Examiner*—Anh Hong Do
(74) *Attorney, Agent, or Firm*—Frommer Lawrence & Haug LLP; William S. Frommer; Gordon Kessler (57) ABSTRACT

The present invention relates to an encoding device and encoding method, decoding device and decoding method, information processing device and information processing method as well a medium, encoding device to perform encoding of a first information according to a second information, comprising receive means to receive the first and the second information, and encoding means to encode the first information according to the second information so that decoding can be performed by utilizing the energy deflection possessed by the first information.

12 Claims, 5 Drawing Sheets

ENCODING DEVICE AND ENCODING METHOD, DECODING DEVICE AND DECODING METHOD, INFORMATION PROCESSING DEVICE AND INFORMATION PROCESSING METHOD AS WELL AS A MEDIUM

BACKGROUND OF THE INVENTION

1. Field of the Invention

The present invention relates to an encoding device and encoding method, decoding device and decoding method, information processing device and information processing method as well a medium, and relates in particular to an encoding device and encoding method, decoding device and decoding method, information processing device, information processing method and medium for providing encoded data capable of being decoded without requiring extra measures or costs.

2. Description of Related Art

Various techniques have been proposed in the conventional art as encoding methods for video, audio, text and other information.

However, the encoded data obtained from conventional encoding methods basically incorporates some kind of extra measure in order to decode that encoded data. Implementing this extra measure in the encoded data increases the overall data quantity and adversely affects the compression rate.

SUMMARY OF THE INVENTION

In view of the above problems with the conventional art, this invention has the object of providing encoded data capable of being decoded without an extra measure and further a method for decoding this encoded data without requiring an extra measure.

In order to achieve the above object, the encoding device of this invention is characterized in having an encoding means capable of encoding a first information in accordance with a second information by performing decoding utilizing the energy deflection possessed by the first information.

The encoding method of this invention is characterized by encoding a first information in accordance with a second information by performing decoding utilizing the energy deflection possessed by the first information.

The decoding device of this invention is characterized in containing a decoding means for decoding encoded data in the first information and the second information by performing decoding utilizing the energy deflection possessed by the first information.

The decoding method of this invention is characterized by decoding the encoded data in the first information and second information by utilizing the energy deflection possessed by the first information.

The information processing device of this invention is characterized in that the encoding device has an encoding means to encode the first information according to the second information and output the encoded data so that decoding can be performed by utilizing the energy deflection possessed by the first information, and further in that the decoding device has a decoding means to decode the encoded data in the first and the second information by utilizing the energy deflection possessed by the first information.

The information processing method of this invention is characterized in that the encoding device encodes the first information according to the second information and outputs the encoded data so that decoding can be performed utilizing the energy deflection possessed by the first information, and further in that the decoding device decodes the encoded data in the first and second information by utilizing the energy deflection possessed by the first information.

The medium of this invention is characterized in providing encoded data by encoding the first information according to the second information so that the encoded data can be decoded by utilizing the energy deflection possessed by the first information.

DETAILED DESCRIPTION OF THE PREFERRED EMBODIMENTS

Figure 1:
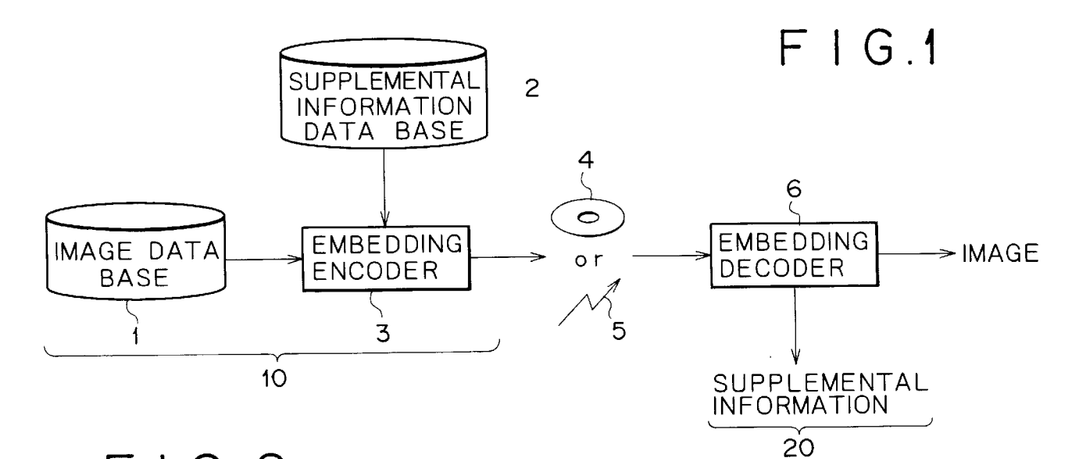
FIG. 1 is a block diagram showing the structure of an embodiment of the image transfer system of this invention.

The structure of an embodiment of the image transfer system (system comprises a plurality of devices collected in a logical manner regardless of whether the devices are in the same cabinet or not) of this invention is shown in FIG. 1.

The image transfer system is comprised of an encoding device 10 and a decoding device 20. The encoding device 10 outputs for instance, an image (first information) encoded into encoded data. The decoding device 20 is configured to return the encoded data back into the source (original) image.

More specifically, an image data base 1 stores the image for encoding (for instance a digital image). The images stored in that image base 1 are then loaded and supplied to an embedding encoder 3.

A supplemental information data base 2 stores digital data as the supplemental information (second information) which is the supplemental information for encoding. The supplemental information stored in the supplemental data base 2 is loaded and supplied to the embedding encoder 3.

The image from the image data base 1 and the supplemental information received from the supplemental information data base 2 are received in the embedding encoder 3 (receive means) (encoding means). This image is further encoded and output according to the supplemental information from the supplemental information data base 2 by way of the embedding encoder 3 so that the encoded data can be decoded by utilizing the energy deflection possessed by the image. In other words, the embedding encoder 3 embeds supplemental information in the image, encodes that image and outputs the encoded data so that decoding can be performed by utilizing the energy deflection of the image. The encoded data output by the embedding encoder 3 may for instance, be recorded on a recording medium 4 such as a magneto-optic disk, a magnetic disk, an optical disk, magnetic tape, a phase change disk or may for instance be transferred by way of a recording medium 5 such as a ground wave, satellite channel, CATV (cable television) network, the Internet or a public telephone line and supplied to the decoding device 20.

The decoding device 20 is comprised of an embedding decoder 6 (receive means) (decoding means). The embedding decoder 6 receives encoded data supplied by way of a record medium 4 or a transfer medium 5. This embedding decoder 6 decodes the source (original) image and the supplemental information by utilizing the energy deflection possessed by the image. The decoded image is supplied to a monitor not shown in the drawing and displayed on this monitor. After undergoing decoding, the supplemental information is utilized for instance to perform specified processing.

The operating principle of the encoding performed by the embedding encoder 3 of FIG. 1 and the embedding decoder 6 are explained next.

What is generally referred to as information has an energy (entropy) deflection (universality). This deflection is identified as (information having value) information. In other words, an image acquired for instance from filming a certain scenery is an image having an energy deflection corresponding to that scenery, so that the image (such as the pixel value for each picture comprising the image) is associated with that scenery. An image having no energy deflection is nothing more than noise and possesses no value as information.

Therefore, when some kind of operation is performed on information having value, the essential energy deflection possessed by that information can be restored to the original (source) state, and even if the energy deflection has been destroyed, the information can be restored to the original state by returning the destroyed energy deflection to its original (source) state. Restated, the encoded data acquired from the encoding of information, can be decoded back into the original (source) information by utilizing the essential energy deflection possessed by that information.

Attributes such as correlation, continuity and similarity express the energy (deflection) possessed by that information.

The correlation of the information signifies the mutual relation (for instance an autocorrelation or the distance between one structural element and another structural element) between the structural elements (for instance if an image, the pixels and lands comprising that image) of that information.

Figure 2:
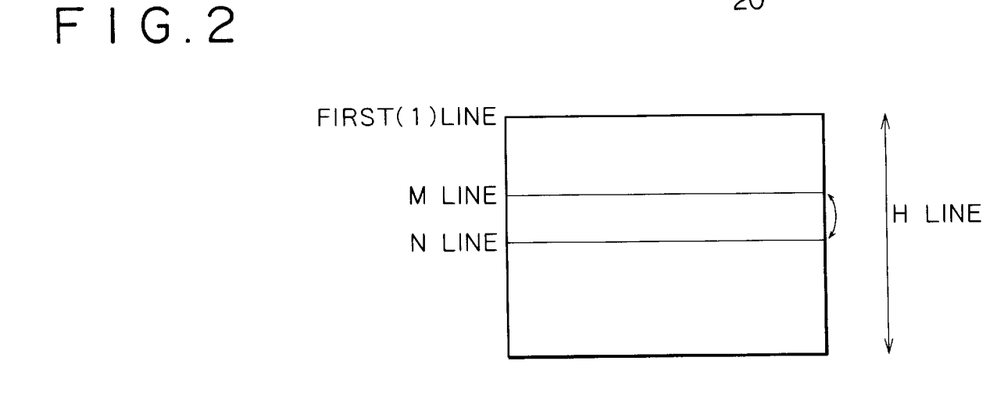
FIG. 2 is a drawing showing the image for encoding.
Figure 3A:
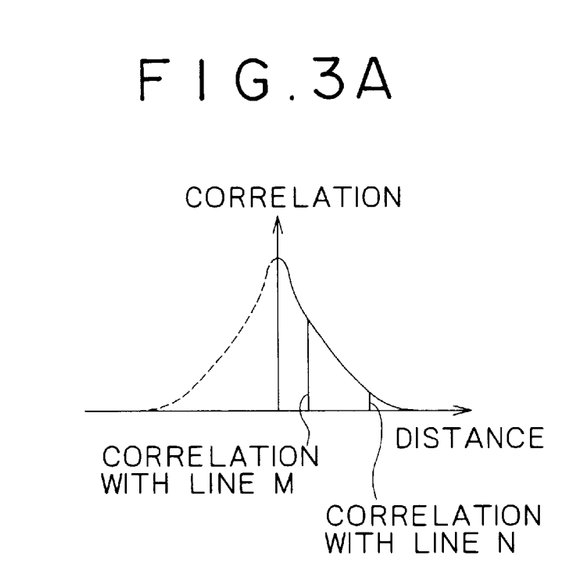
FIG. 3A and FIG. 3B are graphs illustrating the embedding encoding/decoding utilizing the correlation.

In other words, when the image for instance, has an H line as shown in FIG. 2, generally, the correlation of the first line from the top (first line) and other lines becomes larger, the smaller the distance is between a line (upper line on the screen in FIG. 2) and the first line as shown in FIG. 3A. The correlation becomes smaller, the greater the distance a line (lower line on the screen in FIG. 2) is from the first line (a correlation deflection in which the correlation becomes larger the closer to the first line and the correlation becomes smaller, the farther from the first line).

Figure 3B:
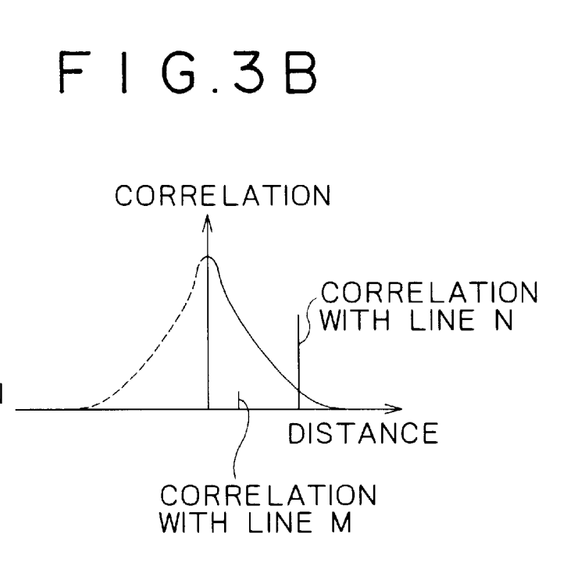

Here, in the image in FIG. 2, interchanging the M line close to the first line with the N line far from the first line (1<M<N≦H) yields a line for example shown in FIG. 3B when the correlation of the first line to the other lines is calculated after interchanging the M and N lines.

Restated, in the image after interchanging, the correlation with the M line (N line prior to interchanging) far from the first line becomes small, and the correlation with the N line (M line prior to interchanging) close to the first line becomes large.

Therefore, in FIG. 3B the correlation deflection is destroyed in the correlation that becomes larger the closer to the first line and the correlation that becomes smaller the farther from the first line. However, the destroyed correlation deflection for the image can usually be restored to the original state by utilizing correlation deflection in which the correlation becomes larger the closer to the first line and smaller the farther from the first line. In other words, in FIG. 3B, the small correlation of the M line close to the first (1) line and the large correlation of the N line far from the first (1) line is clearly unnatural in view of the essential correlation deflection possessed by the image, and the M line and the N line should therefore be interchanged. By interchanging the M line and the N line in FIG. 3B, the correlation as shown in FIG. 3B is obtained or in other words, decoding can be performed to restore the original (source) image.

Here, as explained in FIG. 2 and FIG. 3, encoding of the image is performed by interchanging the lines. Also, in this encoding process, the embedding encoder 3 determines for instance what line to move and how to interchange what line by means of the supplemental information. The embedding decoder 6 on the other hand, utilizes the correlation of the encoded image or in other words, the image whose lines were interchanged, to restore the image back to the original state by interchanging the lines back to the original positions. Further, in this decoding process, the embedding decoder 6 decodes the supplemental information embedded in the image by detecting for example, which mutual lines were interchanged, etc.

The encoding process, besides interchanging the lines may also be performed by for instance, inverting the uppermost bit of the pixel value for pixels at a specified position according to the supplemental information. In such a case, the image can be decoded back to the original image by utilizing the correlation between pixels to restore the uppermost bit of the pixel value to the original position. In this decoding process, the supplemental information is decoded to detect in which pixels the uppermost bit of the pixel value was inverted.

Figure 4A:
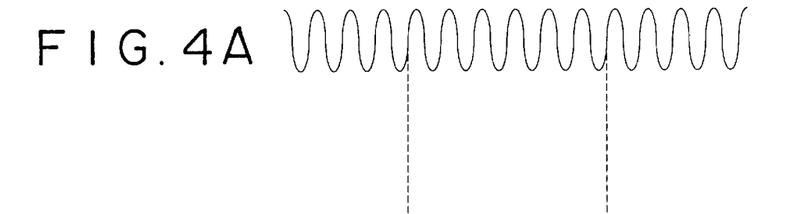
FIG. 4A and FIG. 4B are drawings illustrating the encoding/decoding utilizing the continuity.

Next, in regards to continuity, a continuous frequency variation (frequency changes smoothly) can generally be observed in the signal waveform such as shown in (FIG. 4(a)) for one line of the image. In other words, observing the frequency of a line shows that the change in frequency is generally continuous.

Figure 4B:
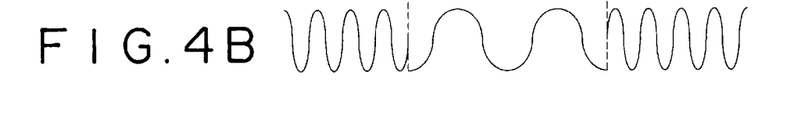

A portion of the continuously changing signal waveform shown in FIG. 4A is for instance, interchanged with an extremely low frequency as shown in FIG. 4B.

In such cases, the continuity of the frequency changes is destroyed. However, the destroyed continuity can generally be returned to the original state by utilizing the continuity of the frequency changes. The portion of the signal waveform in FIG. 4B that suddenly becomes extremely low is an unnatural occurrence compared to the rest of the waveform in view of the continuity possessed by the waveform. This extremely low portion should be substituted with a portion of the waveform identical to the remaining normal portion of the waveform. The waveform signal can then be changed from the waveform in FIG. 4B to the waveform shown in FIG. 4A or in other words, decoding to restore the original signal waveform can be performed.

As explained for FIG. 4, encoding of the image is performed when the frequency for a portion of the signal waveform is subjected to a large charge (interchanging the greatly differing portion of the frequency waveform). The encoding process is performed by the embedding encoder 3 by determining according to the supplemental information what portion of the signal waveform to subject to a large change or to what extent to effect the large change in frequency. In the embedding decoder 6 on the other hand, the encoded signal or in other words the portion of the signal waveform that greatly varies from the remaining portion is decoded back to the original signal waveform or in effect restored back to the original state by utilizing the continuity of the waveform. Further, in this decoding process, the embedding decoder 6 decodes the supplemental information embedded in the image by detecting which portion of the signal waveform has largely changed or to what extent the frequency has largely changed, etc.

Next, with regards to similarity, in for instance an image filmed of a landscape, a method is known to reproduce that enlarged image by utilizing a fractal. In the image for instance of an ocean as shown for instance in FIG. 5A, when the fractal is utilized to enlarge the image, an image (enlarged image) having characteristics identical to the original (source) image can be obtained and images having similarity filmed such as for landscapes can therefore be obtained.

Figure 5A:
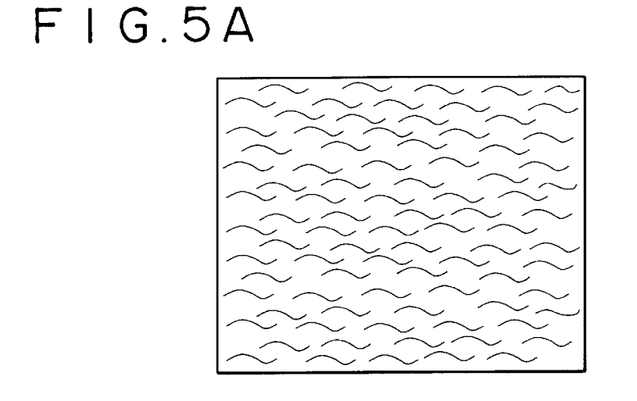
FIG. 5A and FIG. 5B are drawings illustrating the encoding/decoding utilizing the similarity.
Figure 5B:
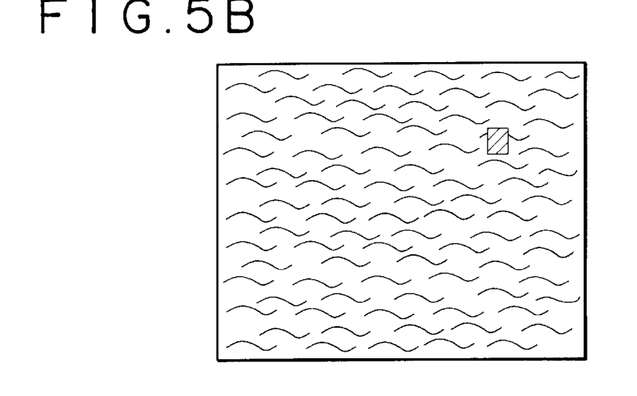

Here, for instance a portion of the image filmed of the ocean as shown in FIG. 5A, is substituted by a portion (portion added with oblique lines in FIG. 5B) of a forest image in FIG. 5B.

In FIG. 5B in the portion substituted with the forest image, the similarity of the image filmed of the ocean is destroyed. However, in the image filmed of the ocean, generally, whatever portion is enlarged can be restored to the state prior to the destruction of similarity by making use of the similarity obtained from an image having the same characteristics as the image filmed of the ocean. Restated, in a portion of the image filmed of the ocean in FIG. 5B, the change to a portion of the image filmed of the forest is clearly unnatural in view of the essential similarity possessed by the image of the ocean. This portion showing the forest should be replaced with an image possessing the same characteristics as the ocean surrounding this forest portion. By making this replacement, the image shown in FIG. 5B can change to the image of FIG. 5A showing only the ocean or in other words, the original (source) image can be decoded.

As explained for FIG. 5, replacing a portion of the ocean image with a forest image, performs encoding of the image. The embedding encoder 3 performs this encoding by determining according to the supplemental information what portion (position on the image) of the ocean image to substitute with the forest image. The embedding decoder 6 on the other hand, restores the encoded signal or in other words utilizes the similarity of the ocean image having a forest image in one portion, to decode it back to the original (source) image of the ocean. Further, the embedding decoder 6, decodes the supplemental information 6, to detect what portion of the ocean image was used to replace the forest image.

The similarity is next explained even further while referring to the drawings in FIG. 6.

Figure 6A:
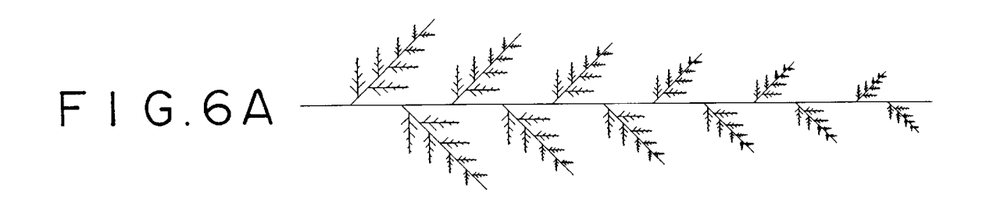
FIG. 6A and FIG. 6B are drawings illustrating the encoding/decoding utilizing the similarity.
Figure 6B:
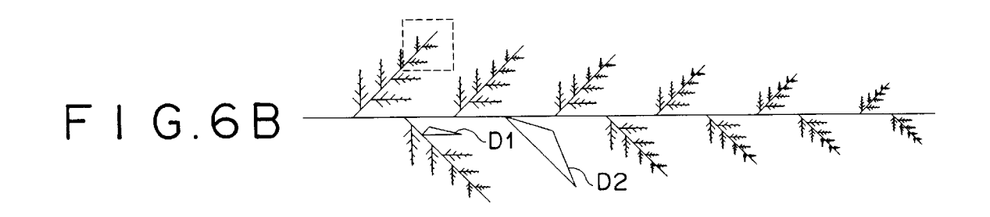

When encoding of the fractal image as shown for instance in FIG. 6A, in the embedding encoder 3 a portion of the fractal image is replaced with a non-similar fractal image, according to the supplemental information and encoding of the fractal image thus performed. Restated, in the embedding encoder 3 for instance, a portion of the fractal image having the shape of a tree leaf as shown in FIG. 6A is replaced with the triangular shape in FIG. 6B. In FIG. 6B, the reference numerals D1 and D2 are triangular shapes. Further, in the embedding encoder 3, information such as the position of the fractal image substituted with the triangular shape and the size and quantity of triangles being substituted with the fractal images are determined according to the supplemental information.

In the embedding decoder 6, the fractal image and the supplemental information may for instance be decoded as shown next. For example, in FIG. 6B, substitution with the triangular figure is not performed on the section with a dotted line square shape. In the embedding decoder 6 the section with the dotted line square is set as the teacher image, and this teacher image and the non-similar shape (in this case the triangle) then searched for. Further, in the embedding decoder 6, the teacher image and non-similar shape consisting of the triangle are substituted with the image (fractal image) generated from the standard pattern of the fractal image contained in the teacher image in order to decode the original (source) fractal image FIG. 6A.

In the case related above, detecting the standard pattern of the fractal image contained in the teacher image was necessary in the embedding decoder 6 and this detection may be performed as follows. The standard pattern of the fractal image of FIG. 6B is detected based on the teacher image, similarity with portions other than the teacher image, as well as the fractal of the teacher image of FIG. 6B. Further, the pattern expressing portions other than the teacher image with the greatest efficiency is detected as the standard pattern.

Also, in the embedding decoder 6, the generated standard for the source fractal image is identified and based on this generation standard, the triangle and the substituted image are generated by using the standard pattern. In the embedding decoder 6, in order to generate the triangle and substituted image, information such as the size of the standard pattern, position and rotation amount are specified based on the generated standard. The standard pattern is then manipulated according to the size of the standard pattern, position and rotation amount and other information specified by the generated standard and the triangle and substituted image (fractal image) thus created.

In the embedded decoder described above, the embedding encoder 3 encodes the image according to the supplemental information and outputs the encoded data so that decoding can be performed utilizing the energy deflection possessed by the image for encoding. Also therefore, in the embedding decoder 6 decoding can be performed of the encoded data without having to employ extra measures, by utilizing the energy deflection possessed by the image, and the source image and supplemental information can be decoded.

Further, supplemental information can be embedded into the image for encoding so that the image can be changed to a state different from the original state so that encryption of the image for encoding can be achieved without having to employ extra measures.

Yet further, complete reversibility through digital watermark can be achieved. In conventional digital watermark, the lower bit of a pixel value with little effect on image quality was changed to a value equivalent to digital watermark however in such cases, the lower bit was not restored back to the original value. The decoded image quality was adversely affected to a large extent by the digital watermark of the lower bit. In contrast to these deteriorating effects on image quality, when decoding of the encoded data is performed by utilizing the deflection energy possessed by the original (source) image, the supplemental image as well as the source image can be obtained. Accordingly, there is no deterioration in image quality of the decoded image due to effects from digital watermark.

Also, the embedded supplemental information can be extracted from the encoded data by the decoding process so that along with the image encoding results, side information can be provided that does not require implementation of extra measures. To restate into other words, this supplemental information can be embedded in the image and also extracted without requiring any extra measures so that the encoded data obtained from this embedding can be compressed (embedded compression) by an amount corresponding to the supplemental information. Accordingly, if for instance half of an image is set for encoding and the remaining half for supplemental information, then the remaining half of the image can be embedded onto the half of the image for encoding so that the image can be compressed by one-half.

Still further, the encoded data is decoded by utilizing the energy deflection or in other words, statistical quantity possessed by the source image so that the decoded result is strongly resistant to errors. In other words, robust encoding (statistical encoding ) can be achieved.

Yet further, the encoded data is decoded by utilizing the energy deflection of the source image so that the more characteristics there are of the energy deflection, or in other words, for instance the higher the activity of the image or the lower the redundancy, then the more the quantity of supplemental information that can be encoded. Here, as related above, the encoded data obtained from the results of embedding the supplemental information can be compressed by an amount corresponding to the supplemental information but in order that decoding can be performed by utilizing the energy deflection possessed by the information for encoding, this information is subjected to a method (embedded encoding method) to encode this information according to the supplemental information so that the higher the activity of the image or the lower the redundancy of the image, the greater the compression rate becomes. The embedded encoding method greatly differs from conventional encoding methods in this respect. In conventional encoding methods, the higher the activity of the image or the lower the redundancy of the image, the lower the compression rate becomes.

Even further, besides setting the image as the target for encoding, a media different from images as the supplemental information. Audio may for instance be utilized as a medium provide the image by using audio as a key. At the encoding device 10 for instance, a contracting party may for instance embed supplemental information such as the audio phrase "magic lamp" in the image. The user says the same audio phrase "magic lamp" at the decoding device 20, and this audio phrase and the audio embedded in the image are utilized to identify the speaker. As a result of this speaker identification, the image can then be automatically made available only when the user is the contracting party. In such a case, the audio used as the supplemental information, can be the audio sine wave itself, rather than a so-called characteristic parameter.

Still yet further, besides encoding audio, a media different from audio can be utilized as the supplemental information. An image can for instance be utilized as the media and the image can be used as a key to provide audio (such as face recognition audio response). In other words, an image of the user's face can be embedded as a response to the user at the encoding device 10, while the user's face can be filmed at the decoding device 20 and the resulting image matched with the audio previously embedded with an image of the user's face and the result then output to achieve an audio response system that makes an audio reply that differs for each user.

Even yet further, a certain media information is capable of being embedded in an identical information media, such as by embedding audio in audio or by embedding images in images. Also, an image can be arranged to be provided only when a user's voice and face image match the voice and face image of the contracting party previously embedded in the image, making possible what could be called a double-lock system.

Yet even further, a synchronized image and audio system comprising for instance a television broadcast signal having either the audio or video, or both, embedded in one media is possible. In this case, a unified (or coordinated) signal can be achieved having unified information from the different media.

Still even further, in the above mentioned embedded encoding method, the more characteristics present in the energy deflection of the information, the greater the quantity of supplemental information that can be embedded. Accordingly by flexibly selecting from among two information items, the information whose energy deflection has a characteristic or feature and then embedding the other information into that selected information, the overall quantity of data can be controlled. In other words, one information item from among two mutual information items, can absorb the information quantity of the other information. As a consequence of being able to control the entire quantity of data, information transmission (network transmission matching the system requirements) can then be performed at a data quantity that matches the communications band for the transmission path, the operating circumstances and other transmission system requirements.

Yet further, by making a shrunken version of an image and embedding (or by embedding into audio, thinned out elements of that audio) the shrunken image into that image, a so-called hierarchical encoding can be achieved.

Further, an image serving as a key for indexing a certain image can be embedded in that image. By making use of this image serving as a key, a database for indexing (searching) images can be achieved.

Next, in the embedding decoder 6 of FIG. 1, the encoded data from the embedding encoder 3 is decoded by utilizing more than one from among the correlation, continuity or similarity of the image. Further, the embedding encoder 3 is capable of performing encoding of the image so that this kind of decoding can be performed.

Figure 7:
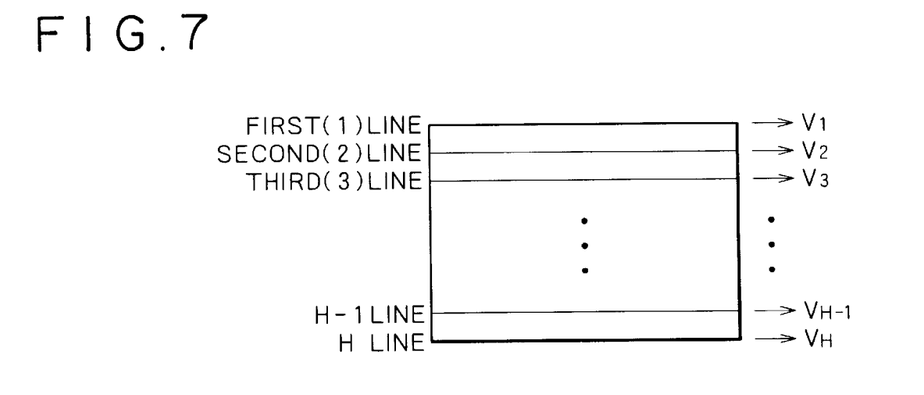
FIG. 7 is a drawing illustrating the line vector.

In other words, in the embedded decoder 3 of FIG. 7, the H line is for encoding of the image, the first (1) line is fixed, and encoding performed by interchanging the second (2) through H line according to the supplemental information.

In this case, the vectors v (hereafter called line vectors) for pixel values of each of the pixels comprising the respective lines of the image of FIG. 7 are utilized to define as a correlation, the distance between mutual line vectors. When decoding of the encoded data is performed in the embedding decoder 6 by using only this correlation, the line vector having the shortest distance to the line vector of the first (1) line (first line as described above, is fixed) is detected, and the line for that line vector established as the second (2) line.

Also in the embedding decoder 6, the line vector having the shortest distance to the line vector of the second (2) line is detected from the encoded data, and the line for that line vector established as the third (3) line. Hereafter, detection is performed in the same way up to the H line from the encoded data and along with decoding to restore the source image, the supplemental information is also decoded to indicate how the second (2) line through H line were interchanged.

The line vector for h line (h=1, 2, ... H) of the image of FIG. 7, is expressed as vh. The track drawn within the line vector space by the line vectors v1, v2 ... VH is shown for instance by the fine, dotted line in FIG. 8.

Figure 8:
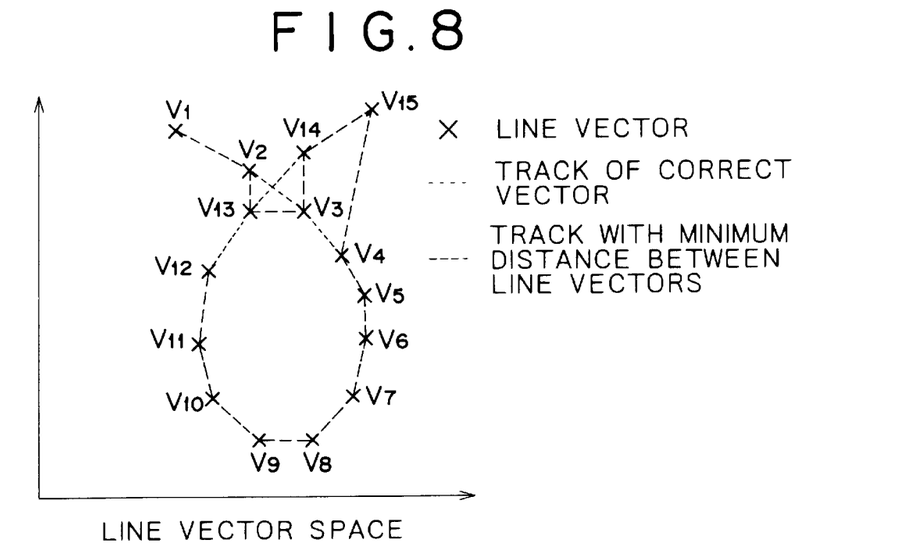
FIG. 8 is a graph illustrating the encoding/decoding utilizing the continuity, similarity and multiple criteria.

In this case, as related above, when the nearest line vectors from the first line (1) are detected in sequence, the track is shown by the thick line in FIG. 8. In other words, the line vector is detected in the order of v1, v2, v13, v3, v14, v15, v4, v5, v6 ... Therefore, the line vector (here, the distance between mutual line vectors) of the correlation cannot be correctly detected and consequently the image and supplemental information cannot be decoded either.

Figure 9:
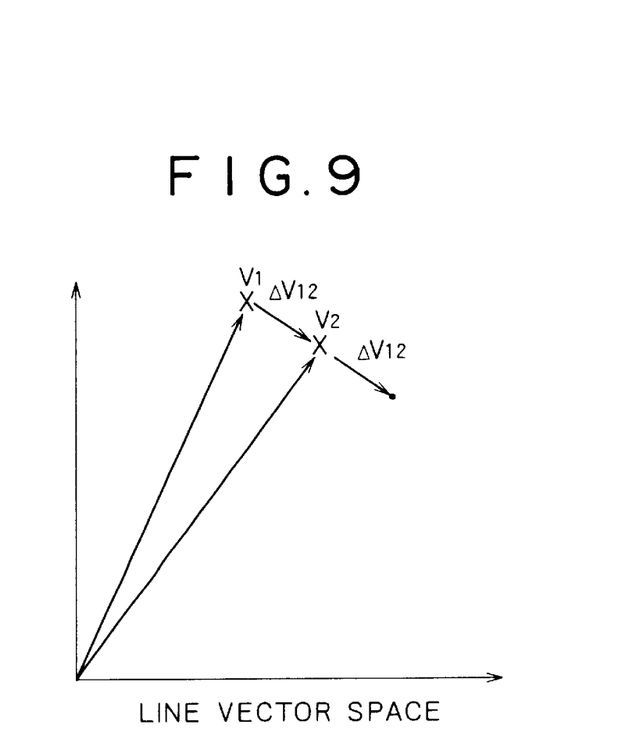
FIG. 9 is a graph showing the line vector space.

Whereupon, the line vector closest to the line vector v1 of first (1) line is detected and after setting the line for that line vector as the second (2) line, the differential vector Δv12 is found for the line vector v2 of the second (2) line, and the line vector v1 of the first (1) line, as for example shown in FIG. 9. Then, the line vector closest to point P12 is expressed by the line vector v2 summed with the differential vector Δv12, and the line for this line vector set as the third (3) line.

The differential vector for the line vector v2 of the second (2) line and the line vector v3 of the third (3) line is found. Next, a line vector is detected that is nearest the point expressed by the line vector v3 added to the above found differential vector. The line vector corresponding to this detected line vector is set as the fourth (4) line. From hereon, the lines are found in the same way up to line H.

Thus, as described above, by utilizing not only the correlation between the h line and h+1 line, the continuity between the line vector vh of the h line, and the line vector vh+1 of the h+1 line, in other words, line vectors can be detected in the order shown drawn for the tracks indicated by the fine dotted lines in FIG. 8. As a result, the image and the supplemental information can be correctly decoded.

The target for encoding of this invention is not limited to images but may for example be audio and text, etc. Further, there are no particular limitations on the supplemental information for embedding in the information for encoding item (however as related above, a portion of the information can be embedded with other portions of that information.)

Therefore, the encoding device and the encoding method of this invention as related above, encode a first information according to a second information so that decoding can be performed by utilizing the energy deflection possessed by the first information. The first and the second information are therefore capable of being decoded without having to implement any extra measures.

The decoding device and the decoding method of this invention decode the encoded information into the first and second information by utilizing the energy deflection possessed by the first information. Therefore, the first and the second information are therefore capable of being decoded without having to implement any extra measures.

In the information processing device and information processing method of this invention, the first information is encoded and output as encoded data according to the second information so that decoding can be performed by utilizing the energy deflection possessed by the first information. Also, this encoded data is decoded into the first and second information by utilizing the energy deflection possessed by the first information. Accordingly, the first and the second information are therefore capable of being decoded without having to implement any extra measures.

The media of this invention, provides encoded data, encoded according to the first and second information so that decoding can be performed by utilizing the energy deflection possessed by the first information. Accordingly, encoded data can be provided that is capable of being decoded without having to implement any extra measures.

What is claimed is:

1. An encoding apparatus, comprising:
   input means for inputting information;
   separating means for separating said inputted information into first information and second information; and
   embedding means for embedding said second information into said first information and outputting encoded first information that can be decoded into decoded first information and decoded second information according to the energy deflection of said first information,
   wherein said decoded first information is of a quality that is the same as said first information.

2. A decoding apparatus, comprising:
   input means for inputting encoded first medium information generated by embedding second medium information into first medium information, and inputting user second medium information associated with said user;
   decoding means for decoding said encoded first medium information into said first medium information and said second medium information based on energy deflection of said first medium information;
   identifying means for identifying a user based on said decoded second medium information and said user second medium information, and
   means for making available said decoded first medium information according to the result of said identifying.

3. A decoding apparatus according to claim 2, wherein
   said input means inputs encoded image data generated by embedding audio data into image data, and inputting user voice data, said decoding means decodes said encoded image data into said image data and said audio data based on said energy deflection of said image data,
   said identifying means identifies a user based on said decoded audio data and said user voice data, and
   said means for making available said decoded first medium information makes available said decoded image data according to the result of said identifying.

4. A decoding apparatus according to claim 2, wherein
   said input means inputs encoded audio data generated by embedding image data into audio data, and inputting user facial image data,
   said decoding means decodes said encoded audio data into said audio data and said image data based on said energy deflection of said audio data,
   said identifying means identifies a user based on said decoded image data and said user facial image data, and
   said means for making available said decoded first medium information makes available said decoded audio data according to the result of said identifying.

5. An encoding apparatus, comprising:
   input means for inputting image data, user voice data and user facial image data; and embedding means for embedding said user voice data and said user facial image data into said image data and encoded image data that can be decoded into decoded image data, said user voice data and said user facial image data according to the energy deflection of said image data, wherein said decoded image data is of a quality that is the same as said image data.

6. A decoding apparatus, comprising:

input means for inputting encoded image data generated by embedding contracted user voice data and user facial image data into image data, and inputting user voice data and user facial image data;

decoding means for decoding said encoded image data into said contracted user voice data and user facial image data;

identifying means for identifying a user based on said decoded contracted user voice data, said decoded contracted user facial image data, said inputted user voice data and user facial image data, and means for making available said decoded image data according to the result of said identifying.

7. An encoding apparatus, comprising:

input means for inputting a television broadcasting signal including synchronized image data and audio data; and embedding means for embedding one of said image data and audio data into the other of them and outputting encoded said other of them that can be decoded into decoded image data and decoded audio data according to the energy deflection of said other of them, wherein said decoded image data and said decoded audio data are of a quality that is the same as said image data and said audio data.

8. An encoding apparatus, comprising:

input means for inputting image data;

means for making shrunken image data from said image data; and embedding means for embedding said shrunken image data into said image data and outputting encoded image data that can be decoded into decoded image data and said shrunken image data according to the energy deflection of said image data, wherein said decoded image data is of a quality that is the same as said image data.

9. An encoding apparatus, comprising:

input means for inputting image data and key image data as a key for searching said image data; and embedding means for embedding said key image data into said image data and outputting encoded image data that can be decoded into decoded image data and decoded key image data according to the energy deflection of said image data, wherein said decoded image data is of a quality that is the same as said image data.

10. An encoding and decoding apparatus comprising:

an encoding element having input means for inputting information, separating means for separating said inputted information into first information and second information, and embedding means for embedding said second information into said first information and outputting encoded first information that can be decoded into said first information and said second information according to the energy deflection of said first information; and a decoding element having input means for inputting encoded first medium information generated by embedding second medium information into first medium information, and inputting user second medium information associated with said user, decoding means for decoding said encoded first medium information into said first medium information and said second medium information based on said energy deflection of said first medium information, identifying means for identifying a user based on said decoded second medium information and said user second medium information, and means for making available said decoded first medium information according to the result of said identifying.

11. The apparatus according to claim 10, wherein in said decoding element:

said input means inputs encoded image data generated by embedding audio data into image data, and inputting user voice data, said decoding means decodes said encoded image data into said image data and said audio data based on said energy deflection of said image data, said identifying means identifies a user based on said decoded audio data and said user voice data, and said means for making available said decoded first medium information makes available said decoded image data according to the result of said identifying.

12. The apparatus according to claim 10, wherein in said decoding element:

said input means inputs encoded audio data generated by embedding image data into audio data, and inputting user facial image data, said decoding means decodes said encoded audio data into said audio data and said image data based on said energy deflection of said audio data, said identifying means identifies a user based on said decoded image data and said user facial image data, and said means for making available said decoded first medium information makes available said decoded audio data according to the result of said identifying.

* * * * *